Dec. 9, 1952 T. H. WARE 2,621,064
FASTENING MEANS FOR TAIL GATES AND THE LIKE
Filed June 28, 1950
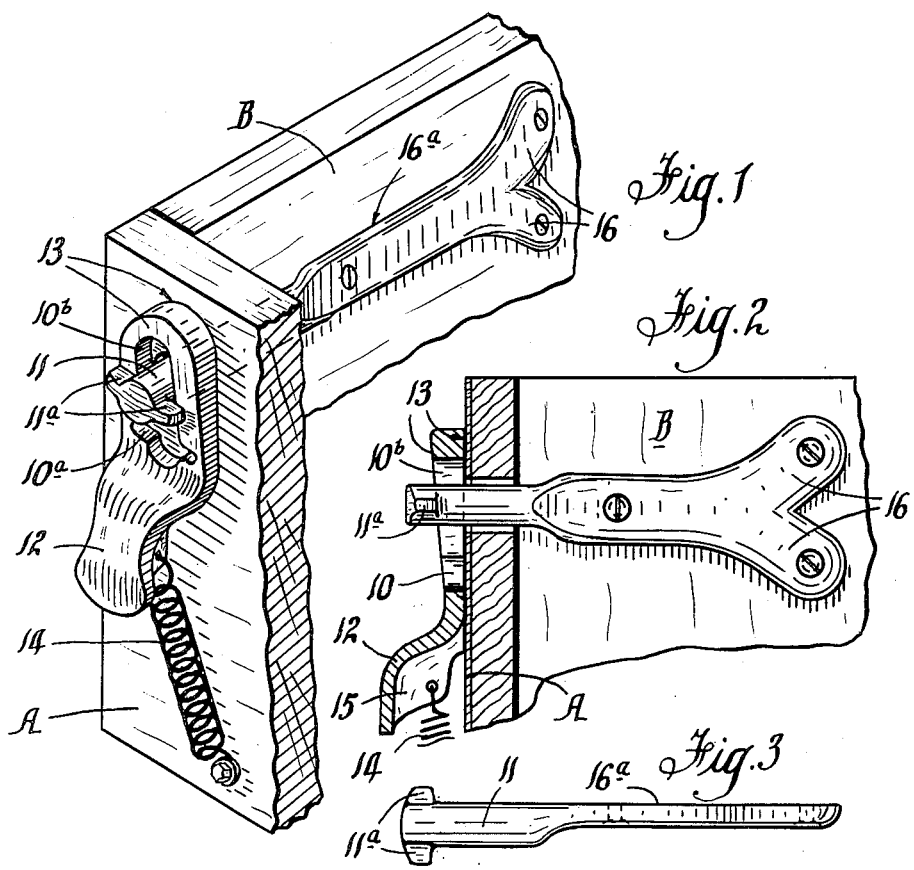
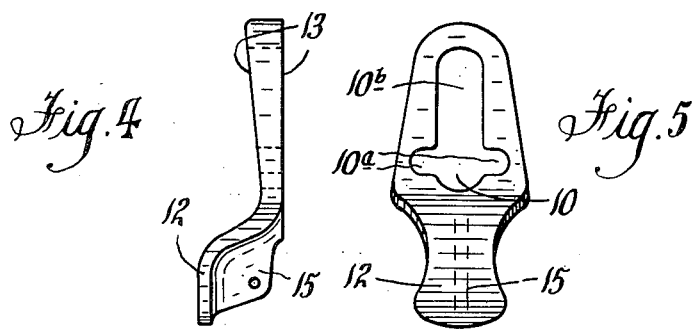
Inventor
Thomas H. Ware
By Young, Emery & Thompson
Attys.

Patented Dec. 9, 1952

2,621,064

UNITED STATES PATENT OFFICE 2,621,064

FASTENING MEANS FOR TAIL GATES AND THE LIKE

Thomas Henry Ware, Palmerston North, New Zealand

Application June 28, 1950, Serial No. 170,781
In New Zealand July 21, 1949

2 Claims. (Cl. 292—302)

The fittings, as made in accordance with this invention, have been particularly designed for use in respect of the fastening means for holding the hinged tail gates of truck bodies in their turned up and closed positions upon the trucks. They, may, however, be used in respect of other vehicle bodies having these gates or doors fitted thereon and adapted to swing down and up in their use in connection with loading and unloading operations concerned with the said vehicles, as for instance railway waggons.

It is usually customary in respect of these hinged gates to provide for the gate being held and locked in its raised position by employing in respect of each end thereof, a round bolt projecting out from the edge of the body opening to be covered in by the gate and by providing a reinforced aperture in the corresponding end of the gate which when the gate is raised passes over such bolt end. The bolt end projects beyond the outside of the gate and a keeper or the like is then placed on the bolt end which by engagement with the gate outer surface holds the gate closed.

It has hitherto been known in respect of these fittings to provide for the retention of the gate upon its bolt by providing the bolt end with pins projecting radially from it at two diametrically opposite points and forming the aperture so that it will pass over the bolt and such pins, and then providing a lever key which is slotted at one end to pass over the bolt end and the pins, to lie between the gate and the pins. This key is shaped with cam or raised faces upon its outside around the slot so that on the rotation of the key upon the bolt these faces will tighten between the gate and the pins and lock the gate and at the same time draw it closed on to its seat in the body frame.

It is found, in use, that these keys due to excess leverage when new and the vibrations of the body to which it is subjected in the use of the truck, are liable to turn on the bolt and lose their holding or tightening action and thus to cause a noisy rattle and at the same time loosen the engagement of the tail with the body.

The present invention has been designed principally with the object of providing an improved construction of key for use in these circumstances and which by reason of its form and manner of use will overcome the said disadvantages attached to the aforesaid form of key.

The invention provides a locking plate so formed as to be capable of being passed over the outer end of the aforesaid bolt, behind the cross pins thereof, and of being moved up and down thereon and which plate is formed of a thickness taperingly increasing towards its upper end so that when drawn vertically down it will wedge in between the said pins and the face of the gate or door with which the fastening is associated to effect the locking action of the gate or door upon the bolt.

The invention also comprises other features of formation of the bolt and of the locking key which are hereinafter described.

In further describing the invention, reference will hereinafter be made to the accompanying drawing in which:

Figure 1 is a perspective use of a left side fitting of a truck gate in use,

Figure 2 is an elevation thereof, the lever key being shown in cross section,

Figure 3 is a plan of the bolt part and

Figures 4 and 5 are, respectively a side view and a front view of the lever key.

In this invention the said key is made of suitable material such as metal plate of width and length such as to provide for the aperture 10 and its radial branches 10a to pass over the bolt end 11 and its pins 11a, which latter for the purposes of the use of this key is arranged so that its pins extend horizontally. The key also is made with a handle 12 extending from its inner end and is made of a thickness taperingly decreasing from its outer end and with flat faces 13. Also the aperture 10 therein is formed with a slot extension 10b towards the outer end of the key and away from the said radial branches. The aperture is thus designed to provide for its lower end being passed over the bolt end 11 and then for the key being drawn vertically downward to cause the edges of the said slot extension passing behind the bolt pins 11a and by reason of the tapering thickness of the plate wedging in between the pins 11a and the surface of the gate A. The key is made of appreciable weight to maintain it in position by gravity and if subjected to vibration will more effectually wedge itself between the pins and the gate to prevent any rattling movement of the gate.

If desired, a tension spring 14 may be provided and have one of its ends secured to the key handle 12 and its other end attached to the gate A beneath, to draw the key downward in its wedging action. This may suitably be provided for by forming the underside of the key's handle part with an integral web 15 extending down its length and with the spring interposed between such web and the gate attachment. This spring may also form the means whereby the key may be attached to the gate to permit of its use. The usual chain attachment, (not shown), however, may be provided.

To release the fastening, the key has merely to be pushed upwards lengthwise, when it may be removed from the bolt end.

Another feature of novelty in the invention is concerned with the provision made for the attachment of the said bolt 11 to the body B of a truck with which the fittings are used. It has been customary hitherto in this connection to provide for the bolt being formed with an inward extension which overlaps the body frame and is secured thereto by a single bolt passing through them. This is a source of weakness and trouble as concerned with the maintenance of the bolt's alignment with the gate when the latter is raised.

It is now proposed to form the inner end of the bolt with two extensions 16 branching laterally therefrom in opposite directions and to provide for each of these extensions being also bolted to the body, in addition to the first mentioned single bolt. This provides a three point and spread fastening which keeps the bolt firm and rigid.

Further the main inner part of the bolt is provided with a straight flat face 16a along its inner side to its inner end, and by reason of the three point spread fastening provides for the bolt being readily adaptable for attachment to either handed or side wall of the truck body.

Having now described my invention what I claim is:

1. In means for fastening a door or tail gate of a truck or waggon in which the edge of the door or gate is formed with an aperture through it and the body of the truck or waggon is provided with a bolt projecting out therefrom over which the aperture in the door or gate passes when the door or gate is closed and which bolt is formed or provided with crosspins at its outer end, the employment of a locking key for engaging and holding the door or gate in its closed position which key consists in a metal plate formed with an aperture therein shaped to pass over the bolt end to a position behind the cross pins thereof and then adapted to slide transversely of the bolt, said plate having a thickness taperingly increasing from its center toward one end to adapt it to wedge between the said pins and the surface of the door or gate when it is slid transversely of the bolt, and resilient means urging the plate to locking position.

2. Means for the purposes herein described and as covered by claim 1, in which the aperture in said locking plate includes a slot adapted to fit upon the bolt, extending from near the thicker end of the plate towards the thinner portion, and formed at the latter portion with branch extensions on the sides thereof adapted to pass over the crosspins of the said bolt.

THOMAS HENRY WARE.

REFERENCES CITED

The following references are of record in the file of this patent:

UNITED STATES PATENTS

| Number | Name | Date |
|---|---|---|
| 1,093,218 | Van Patten | Apr. 14, 1914 |
| 1,371,087 | Haslett | Mar. 8, 1921 |
| 2,284,921 | Purkiss | June 2, 1942 |
| 2,380,782 | Owens | July 31, 1945 |

FOREIGN PATENTS

| Number | Country | Date |
|---|---|---|
| 556,833 | Great Britain | Oct. 25, 1943 |